(12) United States Patent
Tagawa

(10) Patent No.: US 7,477,656 B2
(45) Date of Patent: Jan. 13, 2009

(54) NETWORK APPARATUS AND PROGRAM FOR THE SAME

(75) Inventor: Norio Tagawa, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 806 days.

(21) Appl. No.: 10/929,680

(22) Filed: Aug. 31, 2004

(65) Prior Publication Data

US 2005/0083894 A1  Apr. 21, 2005

(30) Foreign Application Priority Data

Sep. 2, 2003  (JP)  ............... 2003-310584

(51) Int. Cl.
*H04J 3/16* (2006.01)

(52) U.S. Cl. ..................................... 370/465

(58) Field of Classification Search ................ 370/465, 370/466, 467, 469, 471, 277, 282, 474, 475, 370/905, 310, 395.52, 395.72, 401, 347
See application file for complete search history.

(56) References Cited

U.S. PATENT DOCUMENTS

| | | | |
|---|---|---|---|
| 5,450,616 | A | 9/1995 | Rom |
| 5,553,316 | A * | 9/1996 | Diepstraten et al. ......... 370/445 |
| 7,006,484 | B2 | 2/2006 | Hayama et al. |
| 7,203,488 | B2 * | 4/2007 | Luneau ..................... 455/422.1 |
| 2006/0072519 | A1 | 4/2006 | Hayama et al. |

FOREIGN PATENT DOCUMENTS

| | | |
|---|---|---|
| JP | A 7-87093 | 3/1995 |
| JP | A 2000-183935 | 6/2000 |
| JP | A 2002-95065 | 3/2002 |

\* cited by examiner

*Primary Examiner*—Chi H Pham
*Assistant Examiner*—Alexander Boakye
(74) *Attorney, Agent, or Firm*—Oliff & Berridge, PLC

(57) ABSTRACT

A network apparatus has a data transmitting unit that transmits data by wireless at a predetermined output level out of a plurality of output levels, a data processing unit that processes data to be transmitted based on a predetermined protocol selected from a plurality of protocols, a storage unit that stores the output levels of the data transmitting unit associated with the plurality of protocols respectively, and a transmission control unit that controls the data transmitting unit so as to transmit data processed by the data processing unit at an output level associated with the predetermined protocol.

17 Claims, 10 Drawing Sheets

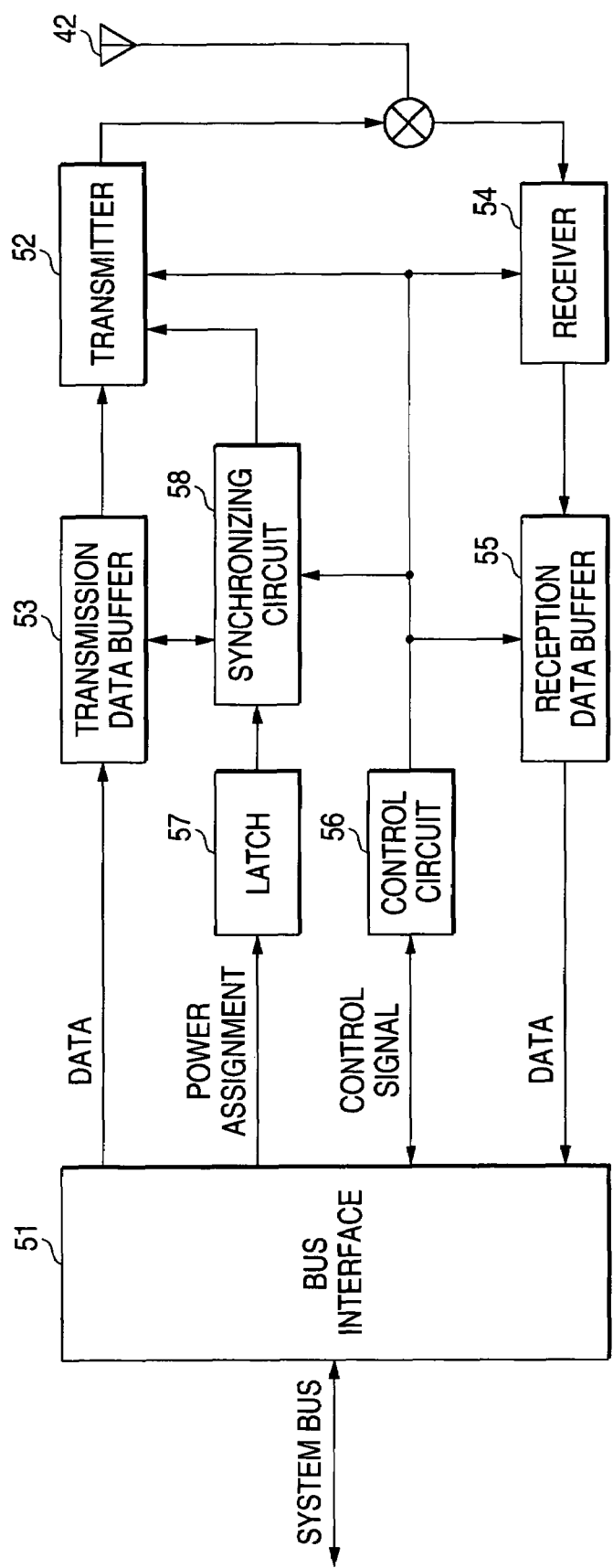

NETWORK APPARATUS AND PROGRAM FOR THE SAME

BACKGROUND OF THE INVENTION

1. Field of the Invention

The present invention relates to a network apparatus which performs data communication by wireless, and a program for the network apparatus.

2. Description of the Related Art

In recent years, wireless LAN (Local Area Network) systems have been coming into wide use.

In such a wireless LAN system, a limited number of wireless channels are shared among a plurality of nodes. Accordingly, with increase of nodes, communication conditions become severer. In particular, firstly, it can be imagined that the case where no free wireless channel can be detected in carrier sense occurs more frequently. Secondly, it can be imaged that the case where crosstalk is caused by concurrent transmission occurs more frequently.

Description will be made in more detail. Assume that wireless communication is initiated between nodes. Before transmitting data, a transmission-side node receives radio waves in an intended channel, and checks whether another node is sending a radio wave or not. This process is referred to as "carrier sense". As a result of the carrier sense, it is concluded that the wireless channel is free when there is no radio wave from any other node. Then, the transmission-side node starts transmitting data to be transmitted. On the contrary, when another node is sending a radio wave, it is concluded that the wireless channel is in use. Thus, the transmission-side node waits till the channel allows data transmission. When the number of nodes using one and the same wireless channel increases, the probability that the wireless channel is in use becomes higher. As a result, the probability that each node waits till the wireless channel allows data transmission also becomes higher. Thus, there occurs a problem that the throughput becomes lower.

In addition, when the number of nodes using one and the same wireless channel increases, the probability that two or more nodes substantially concurrently carry out carrier sense as described above becomes higher. In this event, all the nodes conclude that the wireless channel is free, and start transmitting data substantially concurrently. As a result, crosstalk occurs. The occurrence of crosstalk leads directly to a problem that a data error is generated. Further, when such a data error is detected, there is a problem that the throughput becomes lower due to a retransmitting process carried out by a mechanism mounted for performing the retransmitting process for recovery from an error.

As a method for relaxing the problem, a technique for changing the receiving sensitivity dynamically has been adopted in the background art. That is, the receiving sensitivity is increased when only a weak radio wave arrives, while the receiving sensitivity is reduced when a powerful radio wave arrives. Thus, according to this technique, only a powerful radio wave is received selectively under an environment where the powerful radio wave and a weak radio wave arrive simultaneously.

When a node performs carrier sense with this technique, a weak radio wave may be radiated from a node which is not a target of communication. Even in such a case, when a radio wave from a node which is a target of communication is powerful, the receiving sensitivity of the node performing the carrier sense becomes so low that only the radio wave from the node which is a target of communication is received selectively. Accordingly, there is no fear that it is concluded that the wireless channel is in use due to the weak radio wave from the node which is not a target of communication. Thus, the probability that the node waits till it is allowed to perform data transmission becomes low correspondingly, so that reduction in throughput becomes difficult to occur.

Two or more nodes may perform such carrier sense substantially concurrently, and start to transmit data concurrently. Even in such a case, the receiving sensitivity of each node becomes low when the radio wave from a node which is a target of communication is powerful and the radio wave from a node which is not a target of communication is weak. As a result, each node performing the carrier sense is allowed to selectively receive only the radio wave from the node which is a target of communication. Thus, there is no fear that crosstalk occurs, so that a data error caused by the crosstalk or reduction in throughput caused by the process for retransmitting the data becomes difficult to occur.

That is, when the technique for changing the receiving sensitivity dynamically as described above is adopted, a powerful radio wave can be received by priority so that the adverse effect of the existence of a weak radio wave can be excluded.

When the receiving sensitivity is changed dynamically as described above, a more powerful radio wave is received by priority. Therefore, when it is intended only to improve the communication condition between a node in question and another node, a radio wave between those nodes had better be more powerful. However, if a powerful radio wave is radiated immoderately, it may interfere with communication between other nodes. On the contrary, when it is intended only to prevent interfere with communication between other nodes, a radio wave between a node in question and another node had better be made weaker. However, there is a problem that there is apt to occur a failure such as intermittence of communication between the node in question and another node.

To solve such a problem, for example, JP-A-H7-087093 discloses a technique in which information about the transmitter-side transmitting power is transmitted from the transmitter to a receiver, while the transmitter-side transmitting output level requested by the receiver is fed back from the receiver to the transmitter, so that the transmitter and the receiver can perform transmitting and receiving in optimal conditions without setting the transmitter-side transmitting output level to be too high or too low.

JP-A-H7-087093 is referred to as a related art.

However, when the technique disclosed in JP-A-H7-087093 is adopted, both the transmitter and the receiver have to support a dedicated power control protocol. Even when one of them supports the power control protocol, the transmitting power cannot be optimized if the other does not support the power control protocol.

Some data exchanged between nodes have a comparatively high degree of importance, but some data have a comparatively low degree of importance. In the background art, these data are transmitted on one and the same transmitting output level without any special distinction. Some data exchanged between nodes are data comparatively easy to retransmit (data that can be transmitted any number of times or data having a small data volume), but some data are data comparatively difficult to retransmit (data that can be transmitted only once or data having a large data volume). In the background art, these data are transmitted on one and the same transmitting output level without any special distinction.

For this reason, there is a problem as follows. That is, when a neighbor node transmits data having a comparatively low degree of importance or data comparatively easy to retransmit in a situation that data having a comparatively high degree of importance or data comparatively difficult to retransmit are to be transmitted/received between nodes, the data having a comparatively low degree of importance or the data comparatively easy to retransmit interfere with the transmission/reception of the data having a comparatively high degree of importance or the data comparatively difficult to retransmit. As a result, a data error or reduction in throughput occurs. In this case, the data error may cause no severe problem on the data having a comparatively low degree of importance or the data comparatively easy to retransmit. Those data are easy to retransmit if necessary. However, the data error may cause a severe problem on the data having a comparatively high degree of importance or the data comparatively difficult to retransmit. There may be no measure of retransmission about those data.

SUMMARY OF THE INVENTION

The object of the invention is to provide a network apparatus in which the communication environment can be improved even when the network apparatus is used only on the transmitter side, and data having a comparatively high degree of importance or data difficult to retransmit can be transmitted/received easily by priority.

The invention provides a network apparatus having: a data transmitting unit that transmits data by wireless at a predetermined output level out of a plurality of output levels; a data processing unit that processes data to be transmitted based on a predetermined protocol selected from a plurality of protocols; a storage unit that stores the output levels of the data transmitting unit associated with the plurality of protocols respectively; and a transmission control unit that controls the data transmitting unit so as to transmit data processed by the data processing unit at an output level associated with the predetermined protocol.

In the network apparatus, an output level is set for each protocol of the plurality of protocols. When the data processing unit processes data to be transmitted based on a protocol selected from the plurality of protocols, the transmission control unit controls the data transmitting unit so as to transmit the data to be transmitted at an output level associated with the selected protocol.

More specifically, for example, assume that the data transmitting unit can change over the output level between two levels "high" and "low" at the time of data transmission, and protocols to be used at the time of data transmission include a protocol A to be used for transmitting data having a comparatively high degree of importance (or data comparatively difficult to retransmit), and a protocol B to be used for transmitting data having a comparatively low degree of importance (or data comparatively easy to retransmit). In this case, the output level is set for each protocol A, B in advance so that the output level "high" is set for the protocol A while the transmitting output level "low" is set for the protocol B. When the data processing unit processes data to be transmitted based on the protocol A, the transmission control unit controls the data transmitting unit so as to transmit the data to be transmitted at the output level "high" associated with the protocol A. On the other hand, when the data processing unit processes data to be transmitted based on the protocol B, the transmission control unit controls the data transmitting unit so as to transmit the data to be transmitted at the output level "low" associated with the protocol B.

In such a manner, even if a neighbor node transmits data having a comparatively low degree of importance (or data comparatively easy to retransmit) in a situation that data having a comparatively high degree of importance (or data comparatively difficult to retransmit) are to be transmitted/received between nodes, the probability that the data having a comparatively low degree of importance (or the data comparatively easy to retransmit) interfere with the transmission/reception of the data having a comparatively high degree of importance (or the data comparatively difficult to retransmit) can be reduced. Not to say, when the neighbor node transmits data having a comparatively high degree of importance (or data comparatively difficult to retransmit), the probability that the data interfere with the communication of data having a low degree of importance (or data comparatively easy to retransmit) becomes higher correspondingly. However, as for the data having a comparatively low degree of importance (or data comparatively easy to retransmit), a data error often causes no severe problem. Those data are also easy to retransmit if necessary.

Accordingly, with the network apparatus, data having a comparatively high degree of importance or data comparatively difficult to retransmit can be transmitted/received by priority. In addition, differently from the device disclosed in JP-A-H7-087093, the output level is not adjusted by interaction with the receiver side. Thus, the communication environment can be improved even when the network apparatus is used only on the transmitter side. Thus, it is easy to introduce the device into an existing wireless network system.

The invention also provides a network apparatus having: a data transmitting unit that transmits data by wireless at a predetermined output level out of a plurality of output levels; a storage unit that stores each output level of the data transmitting unit associated with each phase before and after establishment of connection with another network apparatus; and a transmission control unit that controls the data transmitting unit so as to transmit data at an output level associated with each phase of connection with another network apparatus.

The invention also provides a network apparatus having: a data transmitting unit that transmits data by wireless at a predetermined output level out of a plurality of output levels; a storage unit that stores output levels of the data transmitting unit respectively associated with a plurality of wireless communication systems that enables to be used by the data transmitting unit; and a transmission control unit that controls the data transmitting unit so as to transmit data at an output level associated with a wireless communication system used by the data transmitting unit.

Consequently, it is possible to provide a network apparatus in which the communication environment can be improved even when the network apparatus is used only on the transmitter side, and data having a comparatively high degree of importance can be transmitted/received by priority.

BRIEF DESCRIPTION OF THE DRAWINGS

FIG. 4 is a block diagram of a wireless controller;

DETAILED DESCRIPTION OF THE PREFERRED EMBODIMENTS

Next, some embodiments of the invention will be described by way of example.

First Embodiment

Network apparatuses which will be described below as an embodiment of the invention by way of example include a DNS server, a personal computer (hereinafter referred to as "PC") and a printer which can construct a network using a wireless LAN system. In the following embodiments, it is assumed that a system conforming to IEEE 802.11 series standards (IEEE 802.11a, IEEE 802.11b, IEEE 802.11g, etc.) is used as the wireless LAN system. The standards themselves may be other wireless LAN standards.

Figure 1:
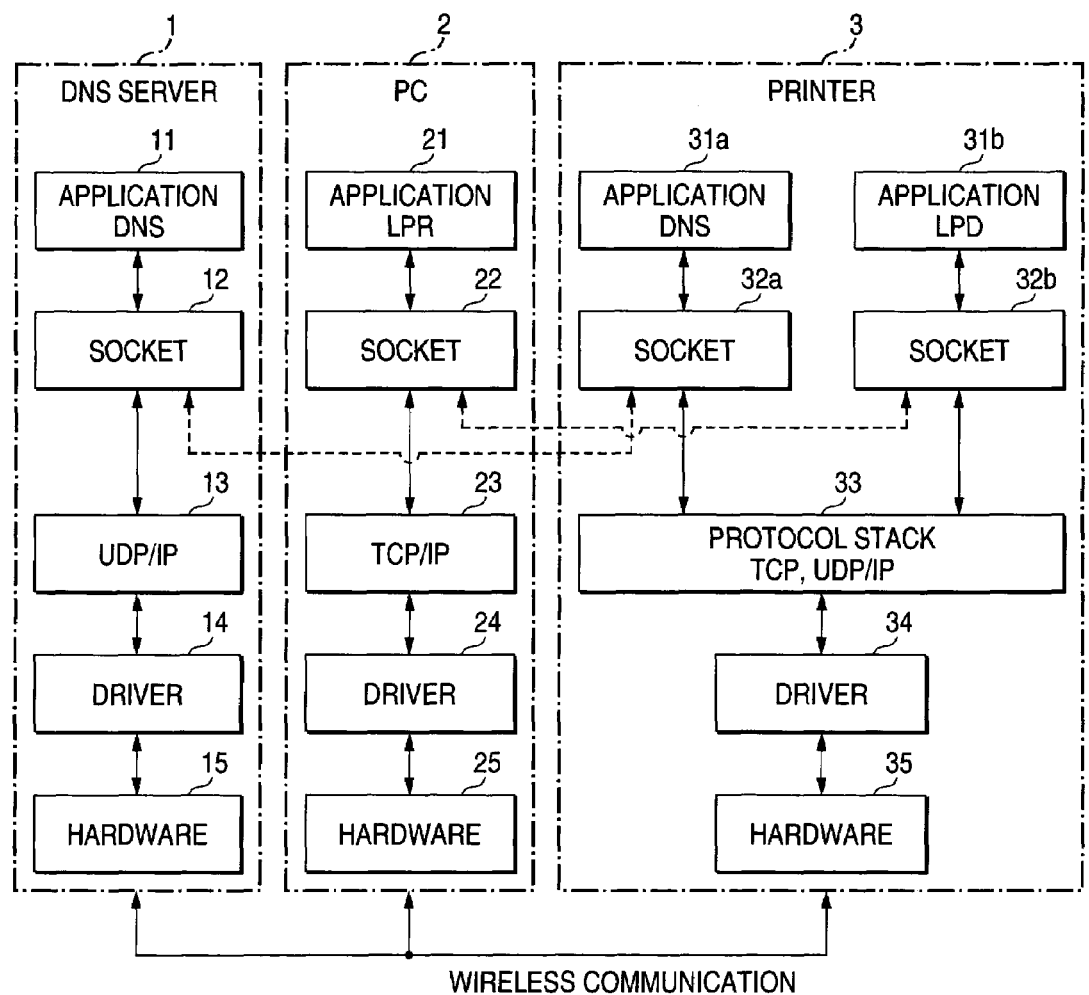
FIG. 1 is a layer diagram of network-related software groups and hardware belonging to a DNS server, a PC and a printer.

FIG. 1 is a layer diagram showing software groups and hardware related to a network and belonging to a DNS server 1, a PC 2 and a printer 3.

The DNS server 1 is a computer for providing a function of converting a domain name assigned to a node on the network into a logical address (IP address) on the network.

The PC 2 is a device capable of providing various functions depending on applications, as known well. In this embodiment, description will be made on the assumption that the PC 2 is a device for providing a function of executing a print process in accordance with an application having a printing function so as to output print data to the printer 3.

The printer 3 is a device for printing on a recording medium such as paper based on print data transmitted via the network.

Each of the DNS server 1, the PC 2 and the printer 3 includes a software group and hardware for constructing a network by a wireless LAN system. The software group and the hardware are classified into layers in view of their functions as shown in FIG. 1. Software or hardware belonging to each layer is paired with a corresponding layer of a device to communicate with. The paired layers perform data processing on one and the same level.

More specifically, applications 11, 21, 31a and 31b are software for providing a data communication function for users or other pieces of software. In each application 11, 21, 31a, 31b, source data (see FIG. 2A) to be transmitted is prepared and delivered to a lower layer. The source data are processed based on one and the same protocol on the transmitter side and on the receiver side, and data processing corresponding to the protocol is performed in the lower layer.

Socket interfaces 12, 22, 32a and 32b are logical ports of communication. Each socket interface 12, 22, 32a, 32b is to establish or release a virtual path for transmitting/receiving data. In view from a layer of each application 11, 21, 31a, 31b, communication is performed in a layer of each socket interface 12, 22, 32a, 32b through a virtual communication channel as shown by the broken line in FIG. 1. In fact, the data are delivered to a lower layer. Though detailed description will be given later, in a layer of each socket interface 12, 22, 32a, 32b, a transmitting output level is acquired from an output level table based on a destination port number of data to be transmitted, and processing is performed so that an output level flag (output level information according to the invention) indicating the transmitting output level is attached to the data to be transmitted (see FIG. 2B).

Protocol stacks 13, 23 and 33 are main portions for performing TCP(UDP)/IP communication. Each protocol stack 13, 23, 33 manages connection with a communication partner, generates data packets, and performs a timeout/retransmission process and the like. In a layer of each protocol stack 13, 23, 33, a MAC header or an IP header is attached to data delivered thereto (see FIG. 2C). Each protocol stack 13, 23, 33 has no concern with the contents of the data delivered from the socket interface 12, 22, 32a, 32b, and handles the delivered data as a simple byte string.

Each Driver 14, 24, 34 is software for controlling wireless communication hardware 15, 25, 35. Each driver 14, 24, 34 divides data received from the protocol stack 13, 23, 33 into real transmission data and the aforementioned output level flag, delivers the real transmission data to the hardware 15, 25, 35, and controls the transmitting power of the hardware 15, 25, 35 so as to transmit the data on a transmitting output level indicated by the output level flag.

Each hardware 15, 25, 35 performs actual physical transmission/reception using radio waves so as to perform processing such as carrier sense. In this embodiment, each wireless communication hardware 15, 25, 35 is implemented as a wireless LAN card conforming to PCMCIA (trademark) standards, which card is inserted into a card slot belonging to each of the DNS server 1, the PC 2 and the printer 3.

Figure 3A:
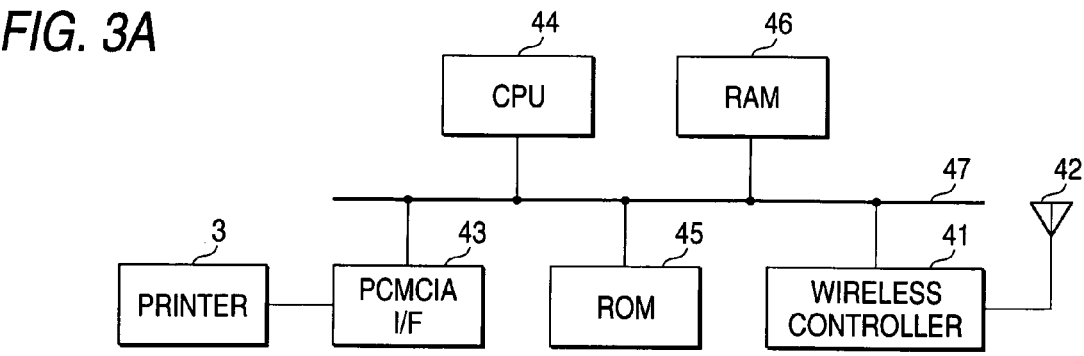
FIGS. 3A and 3B are block diagrams of wireless LAN cards.
Figure 3B:
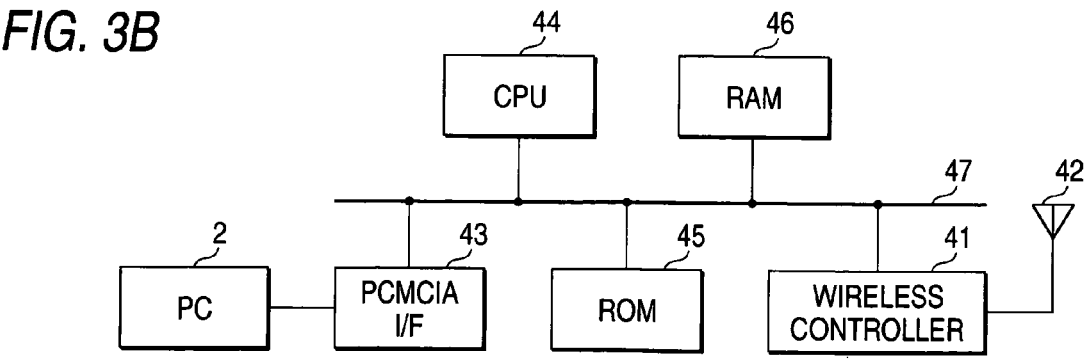

FIGS. 3A and 3B are block diagrams showing the internal configurations of the PC 2, the printer 3 and each wireless communication hardware 25, 35 mounted thereon. Though not shown in FIGS. 3A and 3B, the wireless communication hardware 15 of the DNS server 1 is arranged in quite the same manner.

Each wireless communication hardware 25, 35 shown in FIGS. 3A and 3B is constituted by a wireless controller 41 and an antenna 42 serving to perform wireless communication, a PCMCIA (trademark) I/F 43 for connecting with the PC 2 or the printer 3, a CPU 44 for controlling these parts, a ROM 45 and a RAM 46 for storing programs and data for operating the CPU 44, and so on. These parts are connected through a system bus 47.

A wireless controller 41 is controlled from the CPU 44 via the system bus 47. As shown in FIG. 4, the wireless controller 41 is provided with a bus interface 51 for connecting with the system bus 47, a transmitter 52 for transmitting data, a transmission data buffer 53 for holding the transmission data temporarily, a receiver 54 for receiving data, a reception data buffer 55 for holding the received data temporarily, and so on. A control circuit 56 controls these parts. In addition, the transmitter 52 of the wireless controller 41 is provided with a transmitting output changeover function. Further, the wireless controller 41 is provided with a latch 57 and a synchronizing circuit 58. The latch 57 holds an assignment of a power assignment signal sent from the CPU 44 in order to change over the transmitting output level using the transmitting output changeover function of the transmitter 52. The synchronizing circuit 58 attains synchronization to transmit specified data (packets) with the assigned transmitting power.

Next, as for data to be transmitted/received on the wireless network, specific data will be described by way of example, while description will be made on transmission protocols of the data and a degree of importance of communication using each transmission protocol.

The DNS server 1 has a correspondence table of domain names to IP addresses about network apparatuses present on the network managed by the DNS server 1 itself. In response to a query from another node on the network, the DNS server 1 can provide information indicating the domain name or the IP address of a network apparatus in query. For example, when the printer 3 queries the DNS server 1 about the correspondence relationship of the domain name of a network apparatus to the IP address thereof, the DNS server 1 transmits the printer 3 information about the correspondence relationship of the domain name of the network apparatus in query to the IP address thereof. This process is executed by the application 11 of the DNS server 1 and the application 31a of the printer 3. In that event, a DNS protocol is used.

The other network apparatus (for example, the printer 3) making a query to the DNS server 1 has a storage area called a cache. After information about the correspondence relationship of the domain name to the IP address is received from the DNS server 1, the information is stored in the cache. When the same information is then required, the other network apparatus (for example, the printer 3) acquires the information from its own cache. When such a cache is provided, the other network apparatus (for example, the printer 3) can acquire information more rapidly than it acquires the same information from the DNS server 1. In addition, the load on the network can be relieved. The information in the cache will be updated if some time has passed. For example, when the valid time set for each information has been expired, or when the date has changed, the other network apparatus (for example, the printer 3) tries to update the information in the cache at various timings. Also in this event, the DNS protocol is used in the same manner as described above.

When there occurs a communication error in data communication using the DNS protocol, the other network apparatus (for example, the printer 3) suspends the query to the DNS server 1 simply, and puts off the update of information in the cache until the next update time. After that, the other network apparatus keeps using the not-updated information stored in the cache as it is until the next update time (for example, several hours later or one day later). Such a process is carried out for the following reason. That is, the correspondence relationship of the domain name to the IP address is generally not changed frequently. Therefore, there will be often no actual harm if the other network apparatus keeps using the not-updated information. On the contrary, if the query is repeated many times in a short period of time (for example, at an interval of several seconds to several tens of seconds) until success in update, an excessive load will be placed on the network.

In other words, it is taken for granted that the query to the DNS server 1 is desired to be successful if possible. However, it can be also said that the communication will have no problem on practical use if it is failed some times. It can be noted that the data communication using the DNS protocol is a data communication having a comparatively low degree of importance for the other network apparatus (for example, the printer 3).

On the other hand, when a user performs a predetermined operation in the PC 2 during use of the application 21 having a printing function, the PC 2 transmits print data to the printer 3. In this event, the application 21 of the PC 2 makes a print request to the printer 3 using an LPR protocol, while the application 31b of the printer 3 waits for arrival of the print request using an LPD protocol. Thus, data communication is performed between the PC 2 and the printer 3.

When there occurs a communication error in the data communication using the LPR protocol, the PC 2 performs a process for retransmitting data (packets) where the error has occurred. This retransmitting process is repeated whenever a communication error occurs. Such a process is performed for the following reason. That is, when the print process is continued in spite of the communication error, there may occur a garble or other failures in printing. On the other hand, when the print process is suspended simply, there is a problem that printing before the suspension becomes useless.

In other words, transmission of print data from the PC 2 to the printer 3 is an important communication in which any error cannot be ignored even in consideration of the load on the network or reduction in throughput due to an error recovery process. That is, it can be noted that the data communication using the LPR protocol is a data communication having a comparatively high degree of importance for the PC 2 and the printer 3.

In this embodiment, therefore, the DNS server 1, the PC 2 and the printer 3 make communication with the transmitting power level set as "low" when data communication is performed using the DNS protocol. On the other hand, the DNS server 1, the PC 2 and the printer 3 make communication with the transmitting power level set as "high" when data communication is performed using the LPR protocol. Thus, print data to the printer 3 can be transmitted/received in preference to query data to the DNS server 1.

Description will be made below in more detail on a communication process for making communication with the transmitting power level being changed to "high" and "low" in accordance with a protocol, in an case where print data are transmitted using the LPR protocol by way of example.

Figure 5:
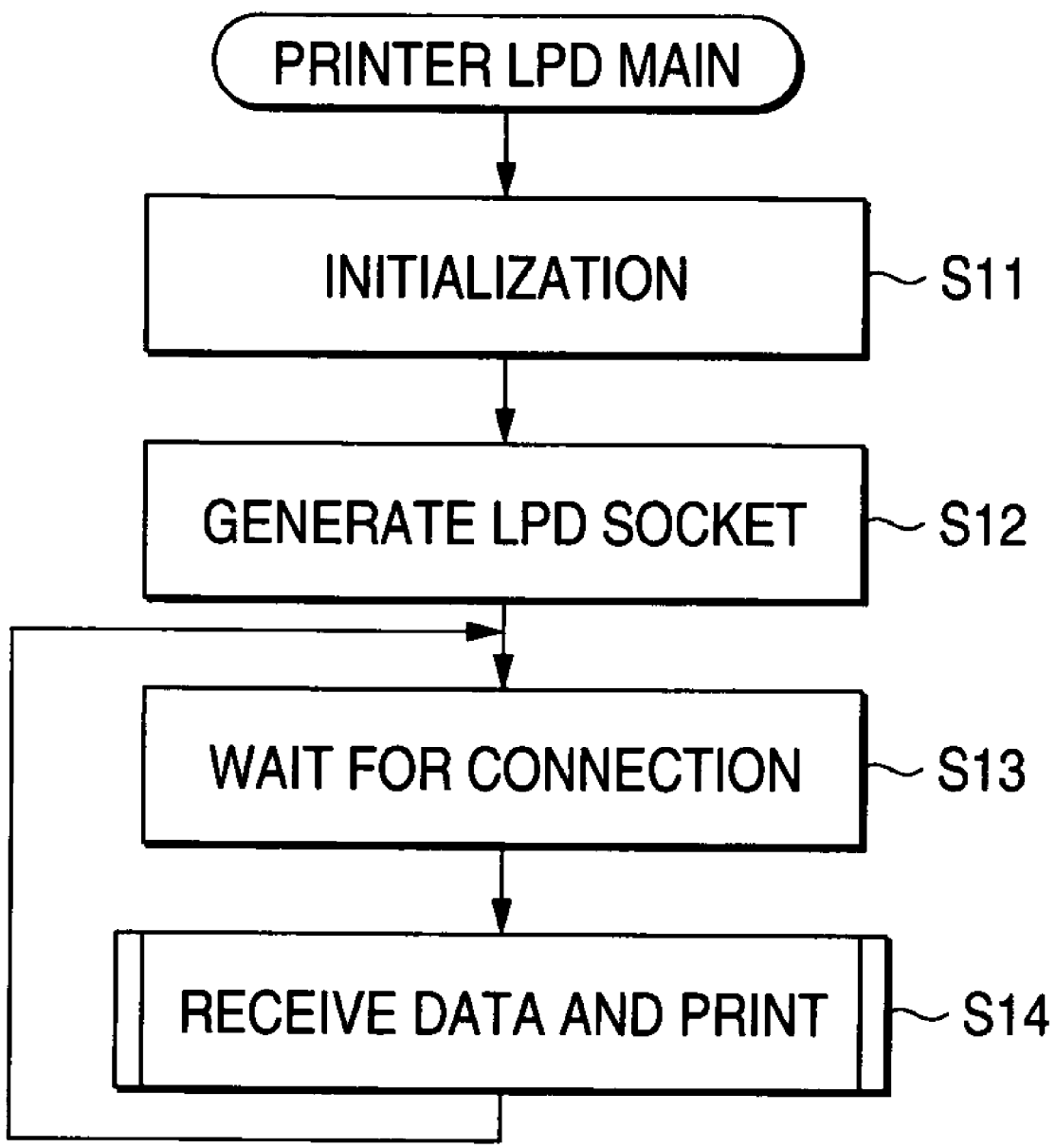
FIG. 5 is a flow chart of a printer LPD main process.

In communication using the LPR protocol, first a printer LPD main process shown in FIG. 5 is executed on the printer 3 side. This process is a process to be executed as soon as the power switch of the printer 3 is turned on. When the process is started, the printer 3 first executes a process for initializing each portion of the printer 3 (S11), generates a socket in an LPD port (S12), and waits for connection from the PC 2 (S13). When connected from the PC 2 in this state, the printer 3 receives print data in accordance with the protocol, and performs a print process based on the print data (S14).

Figure 6:
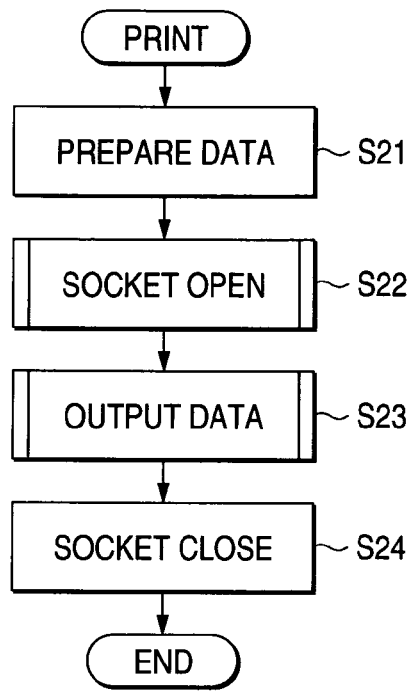
FIG. 6 is a flow chart of a print process.

On the other hand, a print process shown in FIG. 6 is executed on the PC 2 side. This process is a process to be executed when the user is using the application 21 having a printing function. When the process is started, the PC 2 first prepares data (print data) required for a print output (S21). The data are, for example, comprised of character data, data indicating the font category, the size, the color and other attributes about the character data, image data, various control data, etc. The data are prepared by various methods. For example, the user generates the data using the application 21 (specifically a word processor, a graphic editor, etc.), or reads data recorded in a hard disk unit.

Figure 7:
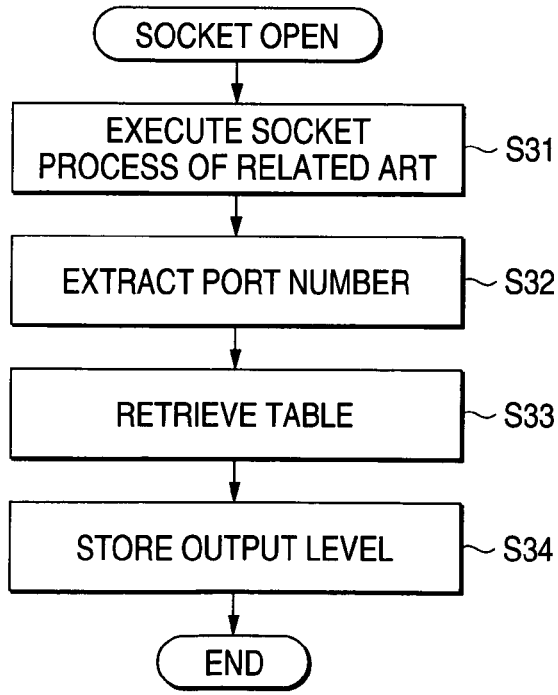
FIG. 7 is a flow chart of a socket open process.

When the print data has been prepared, the PC 2 next opens a socket for connecting with the LPD port of the printer 3 (S22). In more detail, Step S22 is a process as shown in FIG. 7.

When the socket open process is started, the PC 2 executes a socket process similar to that in the background art (S31), so as to establish a virtual communication channel for transmitting/receiving data.

Next the PC 2 extracts a port number from the print data (S32), and retrieves an output level table using the port number as a key (S33). The output level table is a table in which the correspondence relationship of port numbers to transmitting output levels is recorded and which is stored in a memory of the PC 2. A read only memory (ROM) may be used as the memory. In this case, the contents of the output level table are fixed. Alternatively, a rewritable ROM (such as a flash memory) or a nonvolatile RAM designed to hold memory contents due to power supplied from an internal battery may be used as the memory. In this case, the contents of the output level table can be rewritten. When the contents of the output level table can be rewritten, the contents may be able to be updated using SNMP (Simple Network Management Protocol) or the like.

For example, the output level table has contents as shown in the following table.

| Port Number | Transmitting Output Level | Protocol |
|---|---|---|
| 53 | Lo | DNS |
| 80 | Hi | HTTP |
| 515 | Hi | LPR |
| . | . | . |
| . | . | . |
| . | . | . |

Some port numbers are destined to be used in specific protocols in advance. Such port numbers are referred to as "well-known port numbers". For example, as shown in the above table, the port number 53 is destined to be used in the DNS protocol, and the port number 515 is destined to be used in the LPR protocol. Therefore, in the PC 2, the correspondence relationship of the port numbers to the transmitting output levels is stored in the output level table in such a manner that the transmitting output level "Lo" is associated with the port number 53, and the transmitting output level "Hi" is associated with the port number 515.

In Step S33, the above table is retrieved with the port number (515 in this process) extracted in Step S32 as a key. Thus, the transmitting output level "Hi" is detected. That is, when the LPR protocol is used, it is determined that the transmitting output level is set to be "Hi". On the other hand, when the DNS protocol is used, the port number extracted from data is 53. When the output level table is retrieved with the port number as a key, the transmitting output level "Lo" is detected. When the transmitting output level is detected from the output level table, the detected output level is stored in the memory (S34) so that it can be used in a subsequent process.

Figure 8:
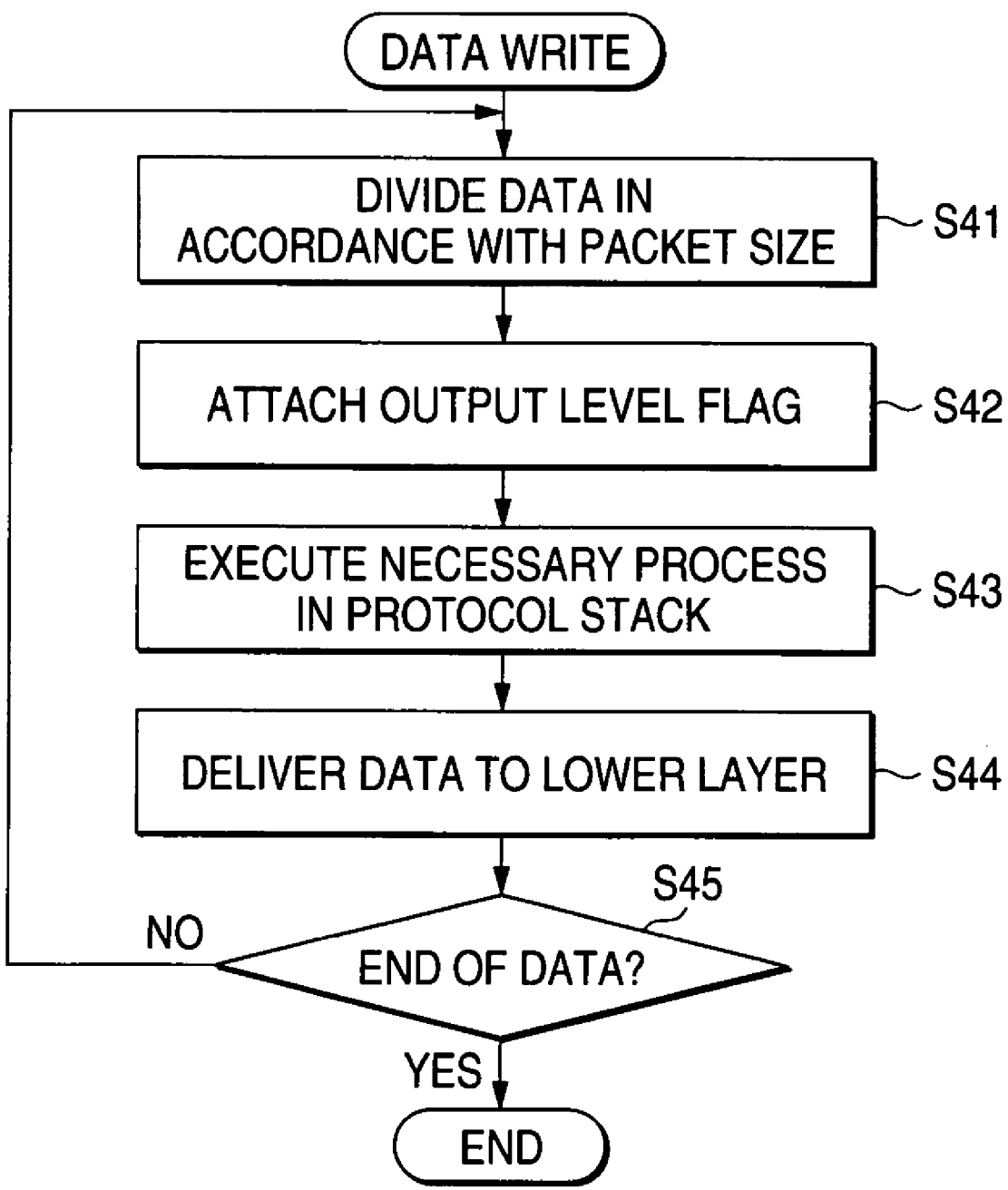
FIG. 8 is a flow chart of a data write process.

The termination of Steps S31 to S34 leads to the termination of Step S22 shown in FIG. 6. Next, the PC 2 outputs print data to the opened socket (S23). More in particular, Step S23 is a data write process shown in FIG. 8.

Figure 2A:
FIGS. 2A to 2D are data structure diagrams of data (packets) to be transmitted.
Figure 2B:

When the data write process is started, the PC 2 first divides the data in accordance with the packet size (S41). An output level flag indicating a transmitting output level stored in the memory in Step S34 is attached to each divided packet (S42). As a result of this step, source data as shown in FIG. 2A is processed into data attached with the output level flag as shown in FIG. 2B.

Next, necessary processing is performed in the protocol stack 23 (S43). The protocol stack 23 is a main part of TCP/IP communication. Particularly in TCP communication, the protocol stack 23 performs complicated processes such as a process of adding a header, a process of generating and checking a check sum, a handshaking process, a time-out process, a retransmission process, etc. These processes themselves are known as processes to be executed by the TCP/IP protocol stack, and detailed description thereof will be omitted here.

Then, the data processed in Step S43 is delivered to a lower layer (S44) so that the data (packets) are transmitted to the destination. The process of S41 to S44 is executed repeatedly till all the print data are processed (S45: NO). When all the print data are processed (S45: YES), this process is terminated.

The termination of Steps S41 to S45 leads to the termination of Step S23 shown in FIG. 6. The PC 2 closes the opened socket (S24), and terminates this process.

Figure 9:
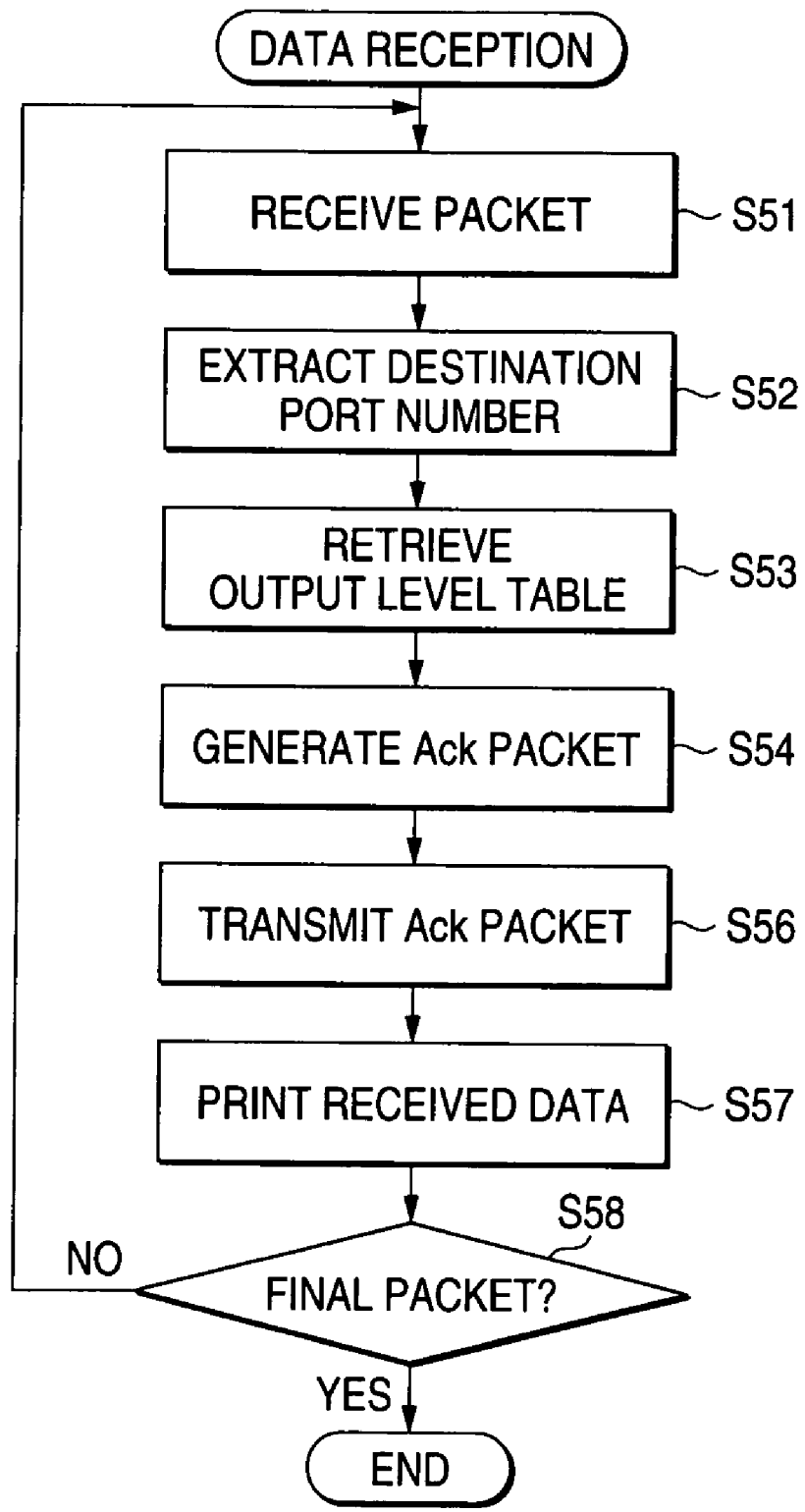
FIG. 9 is a flow chart of a data reception process.

Due to the aforementioned process executed by the PC 2, packets constituting the print data are transmitted from the PC 2 to the printer 3. In this event, the printer 3 waiting in Step S13 shifts to Step S14, in which the printer 3 executes a data reception process shown in FIG. 9.

When the data reception process is started, the printer 3 first receives a packet (S51). The packet is created and transmitted in the aforementioned process of S41 to S45.

Next the printer 3 extracts a destination port number from the packet (S52), and retrieves an output level table with the destination port number as a key (S53). That is, the printer 3 also has a memory storing the output level table recording the correspondence relationship of port numbers to transmitting output levels in the same manner as the PC 2. The printer 3 retrieves the output level table with the port number extracted in Step S52 as a key. As a result, in this embodiment, the printer 3 detects the transmitting output level "Hi" from the output level table.

When the transmitting output level is thus detected from the output level table, the printer 3 generates an Ack packet (S54), and transmits the Ack packet to the PC 2 (S55). In Step S54, an output level flag indicating the transmitting output level detected in Step S53 is attached to the packet in the same manner as in Step S42. That is, from the view of the printer 3, the aforementioned destination port number is a source port number. Based on the source port number, an output level flag indicating the transmitting output level associated with the LPR protocol using the source port number is attached to the packet as data to be transmitted. Then, printing is performed on the basis of the packet received in Step S51 (S57). The process of S51 to S57 is executed repeatedly till all the print data are processed (S58: NO). When all the print data are processed (S58: YES), this process is terminated.

Figure 2C:
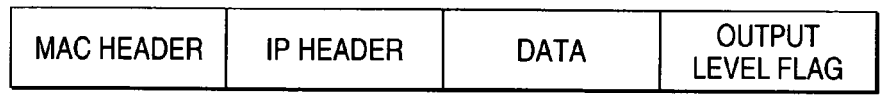

As described above, on the PC 2 side, an output level flag is attached to a packet to be transmitted in Step S42, while on the printer 3 side an output level flag is attached to a packet to be transmitted in Step S54. After processing in the protocol stack 23, 33, data as shown in FIG. 2C are obtained. This packet is delivered to the driver 24, 34.

In Step S42, S54, an output level flag indicating the transmitting power level "high" is attached due to data communication using the LPR protocol as described above. On the other hand, also when the printer 3 makes a query to the DNS server 1 using the DNS protocol, an output level flag is attached to a packet to be transmitted so that data as shown in FIG. 2C is obtained. In this case, however, an output level flag indicating the transmitting power level "low" is attached due to data communication using the DNS protocol.

Figure 10:
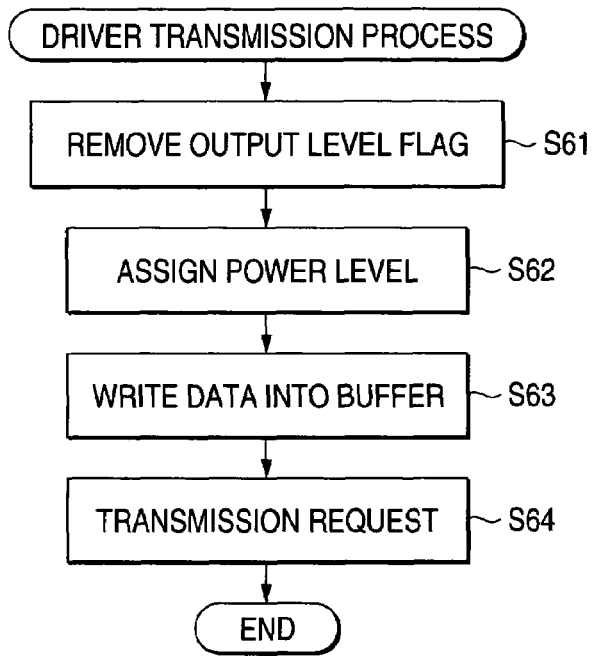
FIG. 10 is a flow chart of a driver transmission process.

Each driver 14, 24, 34 to which the packet attached with the output level flag has been delivered executes a driver transmission process as shown in FIG. 10.

Figure 2D:

When this process is started, the driver 14, 24, 34 removes the output level flag from the packet (S61), and thus creates real transmission data as shown in FIG. 2D.

Then, based on the transmitting output level indicated by the output level flag, a power level is instructed to the hardware 15, 25, 35 (S62). The instruction of the power level is transmitted to the wireless controller 41 through the PCM-CIA (trademark) I/F 43. In the wireless controller 41, the instruction of the power level is transmitted as a power instruction signal to the latch 57 through the bus interface 51, and stored in the latch 57.

Then, the real transmission data are written into a buffer (transmission data buffer 53) (S63), and makes a request to the hardware 15, 25, 35 for transmission of the data in the buffer (S64).

As a result, the hardware 15, 25, 35 determines whether the data can be transmitted or not while detecting the surrounding communication condition. When it is concluded that the data can be transmitted, the synchronizing circuit 58 changes over the output level of the transmitter 52 at the timing in which the setup time for changing over the output of the transmitter 52 has been reflected.

The output level is changed over to either "high" or "low" in accordance with the contents stored in the latch 57. For specific example, the output level of the transmitter 52 is changed over to "high" in data communication using the LPR protocol, while the output level of the transmitter 52 is changed over to "low" in data communication using the DNS protocol.

After that, when the setup time has passed, the data in the transmission data buffer 53 are sent into the transmitter 52, and the data are transmitted actually. The synchronizing circuit 58 restores the output level of the transmitter 52 to its initial level at the timing of the termination of the data transmission.

Figure 11:
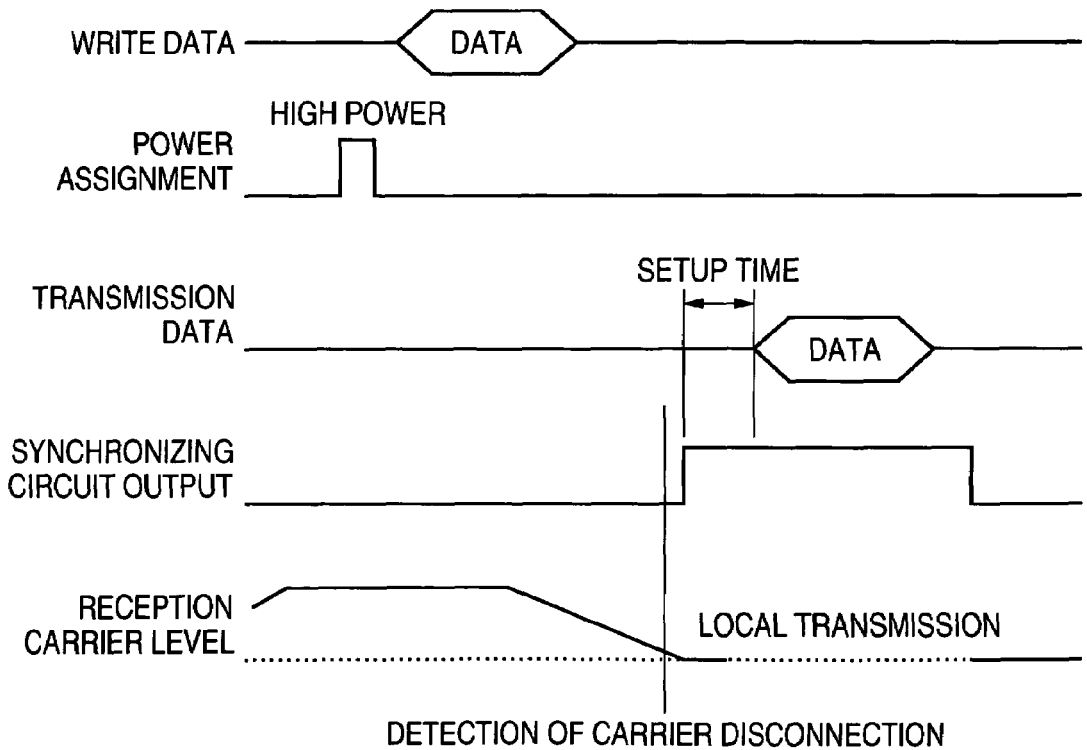
FIG. 11 is a timing chart showing data transmission conditions.

FIG. 11 is a timing chart showing the aforementioned situation. First, when a power level is instructed to the hardware 15, 25, 35 in Step S62, a pulse signal indicating high power is supplied to the latch 57 as a power instruction signal. Next, real transmission data are written into the transmission data buffer 53 in Step 63.

After that, the hardware 15, 25, 35 detects the surrounding communication condition based on the reception carrier level. When carrier disconnection is detected, it is concluded that data can be transmitted. Thus, the synchronizing circuit 58 changes over the output level of the transmitter 52 at the timing in which the setup time for changing over the output of the transmitter 52 has been reflected.

After that, when the setup time has passed, the data in the transmission data buffer 53 are sent into the transmitter 52, and the data are transmitted actually. Thus, the transmitter 52 is in process of transmission. After the termination of the data transmission, the synchronizing circuit 58 restores the output level of the transmitter 52 to its initial level.

The transmitting output level of the next packet may be already known at the timing when the output level of the transmitter 52 is restored to its initial level. In that event, it may be unnecessary to change the transmitting output level. In such a case, the output level of the transmitter 52 may be kept without being restored to its initial level.

When Steps S61 to S64 are carried out thus, the hardware 15, 25, 35 transmits the data with the output level of the transmitter 52 changed over to "high" in the case of data communication using the LPR protocol. On the other hand, in the case of data communication using the DNS protocol, the hardware 15, 25, 35 transmits the data with the output level of the transmitter 52 changed over to "low".

Accordingly, in the situation that print data having a comparatively high degree of importance are to be transmitted/received between the PC 2 and the printer 3, the probability that a comparatively less important query from another wireless network apparatus to the DNS server 1 near the PC 2 and the printer 3 using the DNS protocol will interfere with the transmission/reception of the print data can be reduced. Not to say, the probability that the print data transmitted between the PC 2 and the printer 3 will interfere with communication of the query using the DNS protocol is increased correspondingly. However, as described previously, there often occurs no severe problem on practical use even when the query using the DNS protocol is carried out again later.

Therefore, with the DNS server 1, the PC 2 and the printer 3 which can change the transmitting output level in accordance with a communication protocol in such a manner, print data having a comparatively high degree of importance can be transmitted/received by priority.

In addition, the DNS server 1, the PC 2 and the printer 3 are devices not adjusting their transmitting output levels after communication between the transmitter side and the receiver side but changing over their transmitting output levels in accordance with transmission protocols used by themselves, respectively. Accordingly, even if the aforementioned configuration is used on the transmitter side alone, it is possible to improve the communication environment correspondingly. That is, for example, when print data are to be transmitted from the PC 2 to the printer 3, the aforementioned embodiment has described the case where the transmitting output level is set to be "high" for both transmission packets from the PC 2 to the printer 3 and transmission packets from the printer 3 to the PC 2. However, even in a configuration where the transmitting output level is set to be "high" only for transmission packets from the PC 2 to the printer 3, corresponding effect can be expected. Accordingly, the inventive configuration can be introduced into an existing wireless network system more easily than a configuration where the transmitter side and the receiver side have to be always paired at the time of introduction into a wireless network.

In the aforementioned description, in which the LPR protocol and the DNS protocol are shown by way of example, the transmitting output level is changed in accordance with a difference between the protocols. Degrees of importance may be also defined for other protocols so as to change over the transmitting output level. Thus, in an environment where communications using various protocols are performed, data having a high degree of importance can be transmitted/received by priority.

The standard for defining the degree of importance can differ from one system to another. For example, the following standard can be imagined.

For example, communication using the LPR protocol is a communication carried out only once when a user gives an instruction to print in the PC 2. Accordingly, it is difficult for the printer 3 to acquire the same print data later. On the other hand, as for information obtained as a result of a query to the DNS server 1, the same information can be obtained later. Accordingly, the former can be regarded as higher in degree of importance. This may serve as the standard of the degree of importance.

When retransmission often occurs in a protocol having a large volume of data to be transmitted, the load on the network increases so that the performance is lowered. On the other hand, even when more or less retransmission occurs in a protocol having a small volume of data to be transmitted, adverse effect on the network is slight because the absolute data volume is small. Examples of protocols having a large volume of data to be transmitted include data-oriented protocols such as HTTP, LPR and POP. Examples of protocols having a small volume of data to be transmitted include management-oriented protocols such as DNS, SNMP or NTP. This may serve as the standard of the degree of importance.

Second Embodiment

Next, description will be made on another embodiment different from the first embodiment. The specific contents of processing by software in this embodiment are different from those in the first embodiment, but many other parts (for example, hardware) are shared with the first embodiment. Thus, description will be made mainly on the different points from the first embodiment.

The first embodiment has explained that some port numbers are destined to be used in specific protocols in advance. However, port numbers may be dynamically assigned to some protocols. For example, a port number assigned dynamically is used in a print service of UPnP (trademark).

In such a case, therefore, the output level table described in the first embodiment is prepared on a rewritable memory. After a port number is assigned dynamically, the correspondence relationship of the port number to a transmitting output level is added into the output level table. Thus, the correspondence relationship of the port number to the transmitting output level can be read from the output level table in a subsequent process.

Figure 12:
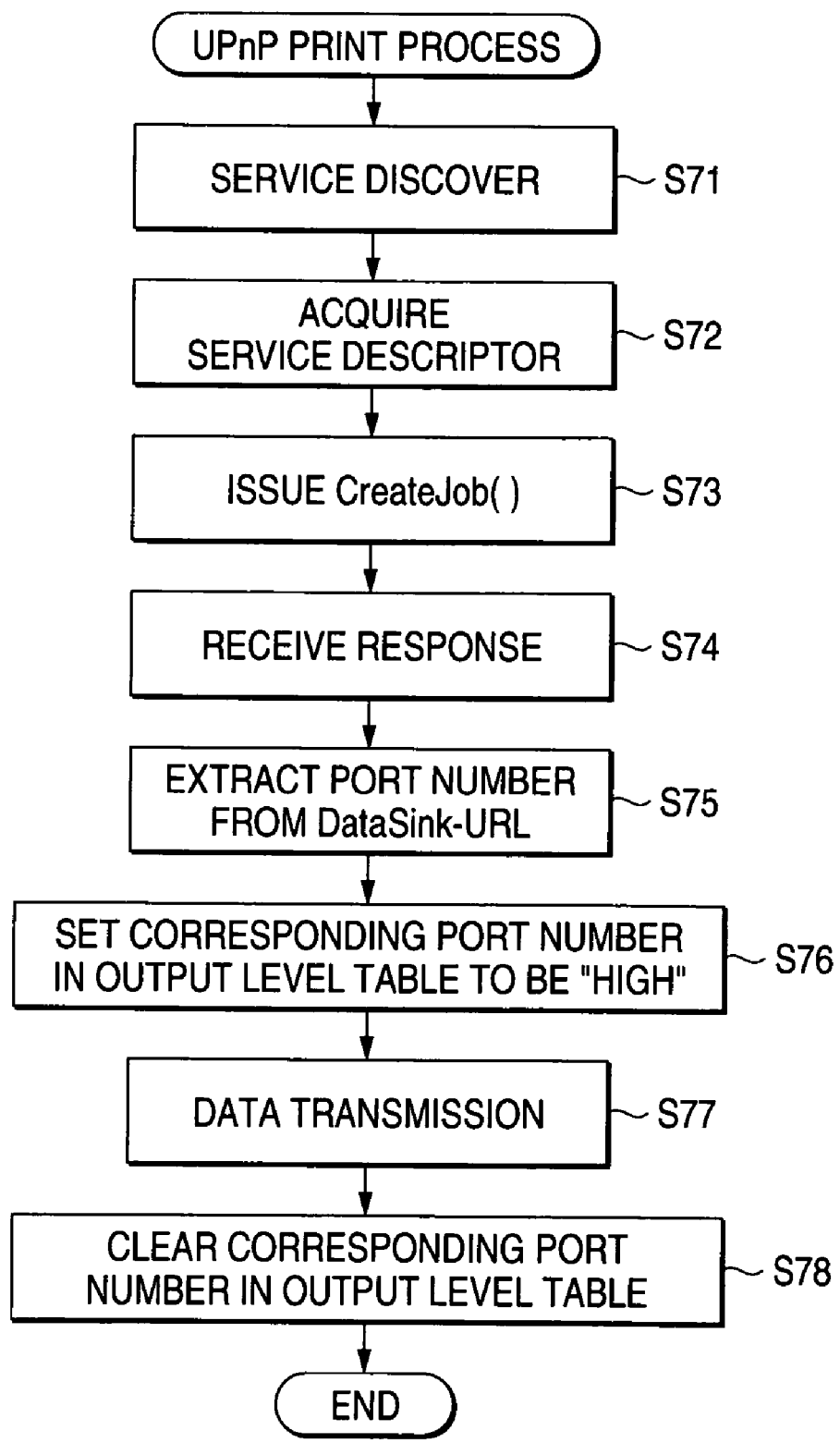
FIG. 12 is a flow chart of a print process.

A specific process will be described below with reference to the flow chart of FIG. 12. This process is a process to be executed by the PC 2 when the PC 2 outputs a print to the printer 3. Description will be pursued on the assumption that the printer 3 is a network printer supporting UPnP (trademark).

When the process is started, the PC 2 searches for the printer 3 based on a service discovery function (S71), and acquires a service descriptor including information about service (print service) provided by the printer 3 and a device descriptor including device information of the printer 3 (S72). Since a packet to be transmitted in Step S71 has a small data volume and has no specified destination, it is desired that the transmitting output level is set to be "low". Then, the PC 2 issues a CreateJobo operation to the print service (printer 3) (S73). This is to create a print job in the printer 3.

When a job is created on the printer 3 side so that the printer 3 gets ready for data reception, the printer 3 sends a response back to the PC 2 (control point). The PC 2 receives the response (S74). A DataSink URL is included in the response. This is to specify a destination to which a substance of print data should be sent. For example, the DataSink URL has a format of "http://10.134.43.60:54321/upnp/printbasic/datasink/job-5001". Here, the portion ":54321" expresses a port number. The port number is assigned dynamically on the service (printer 3) side, but cannot be known beforehand on the control point (PC 2) side.

Therefore, the PC 2 extracts the port number from the DataSink URL (S75), and sets the set value of the transmitting output level in the output level table corresponding to the extracted port number to be "high" (S76). Thus, also for the port number assigned dynamically, the correspondence relationship of the port number to the transmitting output level is added into the output level table.

After that, when data transmission is carried out (S77), in the same process as that is the first embodiment, a packet with an output level flag attached to the data (packet) is delivered to a driver so that the driver can control the transmission power in accordance with the output level flag attached to the packet. When the data transmission is terminated, the corresponding port number in the output level table is cleared (S78). This is because the transmitting output level is not always set to be "high" when the port number is used in other processes.

As described above, according to the PC 2 executing the process of S71 to S78, print data having a comparatively high degree of importance can be transmitted/received by priority in spite of the configuration where a port number serving as a destination of the print data is assigned dynamically.

Third Embodiment

Next, description will be made on another embodiment different from the first and second embodiments. The specific contents of processing by software in this embodiment are different from those in the first embodiment, but many other parts (for example, hardware) are shared with the first embodiment. Thus, description will be made mainly on the different points from the first embodiment.

Though not referred to in the first embodiment, a plurality of processes may be executed by time-sharing control in the PC 2. In such a case, communications using different protocols may be carried out as if they are synchronized with one another.

For example, while intermittent data communication from the PC 2 to the printer 3 using the LPR protocol is carried out by a first application, data transmission from the PC 2 to the DNS server 1 using the DNS protocol may be carried out by a second application. Further, data transmission from the PC 2 to another printer (not shown) different from the printer 3 using the LPR protocol may be carried out by a third application.

In the circumferences, data are sent out in the state where data (packets) to be transmitted using the LPR protocol and data (packets) to be transmitted using the DNS protocol are mixed.

Due to restrictions of hardware used, however, it may be difficult to control to change over the transmitting output level for each packet.

Figure 13:
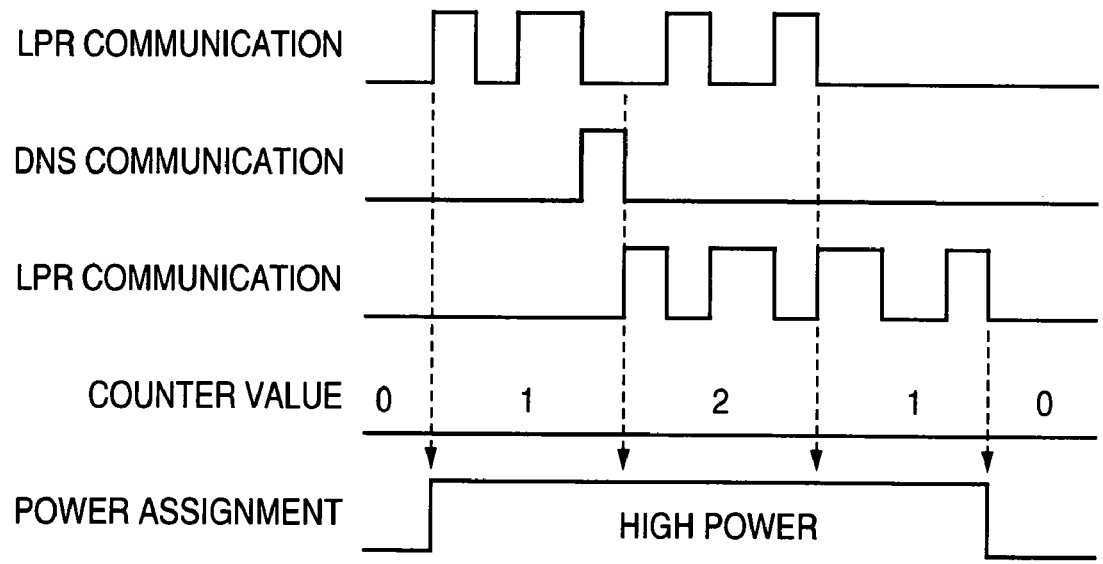
FIG. 13 is a timing chart showing data transmission conditions when a plurality of protocols are processed by time sharing.

Therefore, the third embodiment uses a system for making control so that all the packets are transmitted on a transmitting output level "high" without changing over the transmitting output level to "low" when there is a socket with the transmitting output level "high", as shown in FIG. 13.

That is, as shown in FIG. 13, when communication using the LPR protocol is first started, packets are transmitted intermittently. In this event, even when communication using the DNS protocol is carried out successively, the transmitting output level at that time is kept "high". Assume that another communication using the LPR protocol is further started. In this event, even if the previously started communication using the LPR protocol is completed, but if the later started communication using the LPR protocol is not completed, the transmitting output level at that time is kept "high". Then, when the later started communication using the LPR protocol is completed and there is no socket having a "high" transmitting output level, the transmitting output level at that time is changed over to "low".

The changeover control like this can be achieved in the following manner. That is, using a counter which will be incremented if a socket having a "high" transmitting output level is opened and decremented if the socket having a "high" transmitting output level is closed, control is made so that the transmitting output level is set to be "low" when the counter value is 0, and the transmitting output level is set to be "high" when the counter value is not smaller than 1.

An execution method will be described using a more specific example. The initial value of the counter is set to be 0, and the initial value of the transmitting output level is set to be "low". The output level flag can take three values "no change", "high" and "cancel".

When a socket to be used for communication having a high degree of importance is opened, the transmitting output level is assigned as "high". When the socket is closed, the transmitting output level is assigned as "cancel". As for a plurality of packets to be transmitted in communication having a high degree of importance, an output level flag indicating the transmitting output level "high" is attached to the first transmission packet, and an output level flag indicating the transmitting output level "cancel" is attached to the last transmission packet. An output level flag indicating the transmitting output level "no change" is attached to each of the other transmission packets. In addition, an output level flag indicating the transmitting output level "no change" is attached to each of a plurality of packets to be transmitted in communication having a low degree of importance.

The aforementioned counter is provided in the driver so that data communication hardware is controlled to set the transmitting output level to be "low" when the counter value is 0. The counter is incremented whenever there arrives a packet additionally having an output level flag indicating the transmitting output level "high". When the counter value is not smaller than 1, data communication hardware is controlled so that the transmitting output level becomes "high". On the other hand, the counter is decremented whenever there arrives a packet additionally having an output level flag indicating the transmitting output level "cancel". When the counter value is 0, the data communication hardware is controlled so that the transmitting output level becomes "low".

When the aforementioned process is executed, data having a comparatively high degree of importance can be transmitted/received by priority because the transmitting output level is "high" when data having a high degree of importance is mixed even if it is difficult to make control to change over the transmitting output level for each packet due to restrictions of hardware used.

Fourth Embodiment

Next, description will be made on another embodiment different from the first to third embodiments. The specific contents of processing by software in this embodiment are also different from those in the first embodiment, but many other parts (for example, hardware) are shared with the first embodiment. Thus, description will be made mainly on the different points from the first embodiment.

Generally, data communication using a TCP protocol is a communication required to have comparatively high reliability, while data communication using a UDP protocol is often not required to be as high in reliability as the data communication using the TCP protocol.

Accordingly, the transmitting output level may be made "high" for the data communication using the TCP protocol, while the transmitting output level is made "low" for the data communication using the UDP protocol.

The difference between TCP and UDP can be determined when an application begins to use a socket interface. Therefore, when a socket is opened, the transmitting output level "high" is set in the output level flag in the case of TCP, while the transmitting output level "low" is set in the output level flag in the case of UDP.

When such a process is executed, data communication using the TCP protocol can be processed by priority to data communication using the UDP protocol.

In some cases using UDP, UDP may be used not only for reliability but also for another reason. For example, in movie distribution required to be in real time, UDP is used because not a risk of data loss but a time lag due to retransmission is regarded as a problem. In addition, when movies are distributed to a large number of receivers simultaneously, UDP is used because TCP cannot be used.

In such a case, since error detection or retransmission is not performed in UDP differently from TCP, it is necessary to reduce the inherent rate of error occurrence so as not to reduce the quality of movies. To this end, the transmitting output level may be made "high" for data communication using the UDP protocol, while the transmitting output level may be made "low" for data communication using the TCP protocol. That is, which to attach importance to UDP or TCP can depend on the contents to which a user attaches importance.

Fifth Embodiment

Next, description will be made on another embodiment different from the first to fourth embodiments. The specific contents of processing by software in this embodiment are also different from those in the first embodiment, but many other parts (for example, hardware) are shared with the first embodiment. Thus, description will be made mainly on the different points from the first embodiment.

Each aforementioned embodiment has shown the case where the transmitting output level is set for each protocol to be used for communication in a layer lower than the socket interface. However, an application may assign the transmitting output level explicitly. In a lower layer than the socket interface, the transmitting output level is set for each protocol to be used for communication based on the assignment from the application.

More specifically, a function SETSOCKOPT for setting option values is prepared in the socket interface so that various settings can be made. By use of this function, each application assigns the transmitting output level "high" when its own communication uses a protocol required to have reliability, and assigns the transmitting output level "low" when not so.

For example, in the case of print service of UPnP (trademark) described in the second embodiment, whether data transmission is to DataSink URL can be recognized on the application level. Therefore, in the case of data transmission to DataSink URL, an application may assign the transmitting output level "high".

Likewise, whether the data transmission to DataSink URL will be carried out using an HTTP protocol can be also recognized on the application level. Therefore, when the HTTP protocol is used, an application may assign the transmitting output level "high" regardless of a port number to be used.

When such a process is performed, the transmitting output level is assigned explicitly on the application level. Accordingly, the transmitting output level does not have to be determined in a lower layer than the application. In addition, data having a comparatively high degree of importance can be transmitted/received by priority in the same manner as in each embodiment described previously.

Sixth Embodiment

Figure 14:
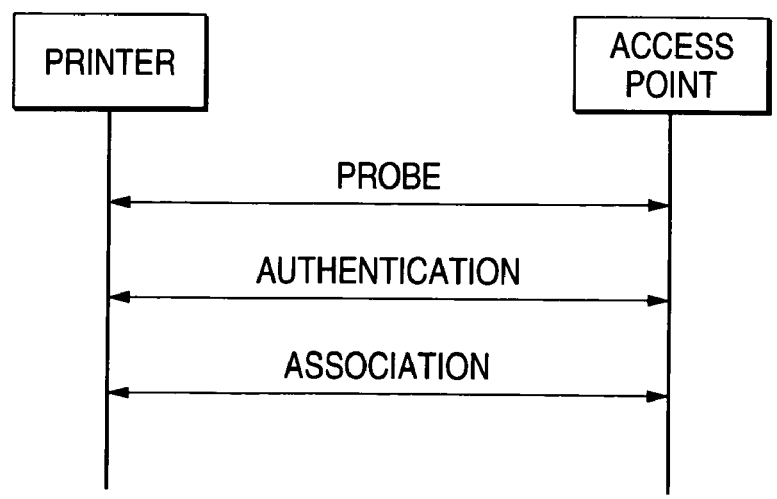
FIG. 14 is a timing chart showing procedures for establishing connection between a printer and an access point.

The aforementioned embodiments have been described using the DNS server 1, the PC 2 and the printer 3 as network apparatuses by way of example. In the sixth embodiment, however, description will be made using an access point for relaying communications among these network apparatuses by way of example. When an access point is to establish connection with another network apparatus, it is necessary to carry out procedures shown in FIG. 14. FIG. 14 is a timing chart showing procedures for establishing connection between a printer as an example of the another network apparatus and an access point. The printer is set in an infrastructure mode due to communication via the access point.

As shown in FIG. 14, for the printer to establish connection with the access point, it is necessary to perform three procedures including a probe procedure for the printer to recognize the access point, an authentication procedure for the access point to authenticate the printer, and an association procedure for the access point to confirm SSID and allow connection. Probes as the first procedure are classified into two systems, an active probe and a passive probe. According to the active probe, the printer sends a probe signal to the access point. The access point receiving the probe signal sends a probe response signal to the printer. The printer receiving the probe response signal recognizes the access point. According to the passive probe, the printer receiving a beacon signal periodically outputted from the access point recognizes the access point based on the beacon signal.

When the three procedures are completed, the printer establishes connection with the access point. In such a manner, in a phase before the connection is established, procedures important to establish the connection have to be carried out between the printer and the access point. It is therefore desired that the output levels of the both are high enough to prevent a transmission error from occurring. To this end, the output levels are set to be "high" before the connection is established, and the output levels are set to be "low" after the connection is established. The output levels set to be low can reduce the probability that they cause a problem such as radio interference. Accordingly, the connection can be established surely, and the interference with other wireless instruments can be suppressed.

Also in a phase before the connection is established, the output levels may be changed in accordance with a procedure. For example, beacon signals are outputted periodically from an access point using a passive probe system. Therefore, there will be particularly no problem even if the printer fails in reception once or twice. Accordingly, in a phase where passive probe is performed, the output level of the access point is set to be "low". Then, a part of beacon signals transmitted a plurality of times may be outputted on a high output level. For example, when beacon signals are transmitted on a high output level at the ratio of once to ten times, it does not take long time for the printer to recognize the access point even in the case where the radio condition is unstable. On the other hand, in the active probe system, the probe response signal is outputted from the access point only once in response to each probe request signal. Accordingly, in the phase where the active probe is carried out, the output level of the access point is set to be "high".

Seventh Embodiment

When no response to data transmitted by a network apparatus such as the DNS server 1, the PC 2 and the printer 3 cannot be obtained within a predetermined period of time (when time out), the network apparatus has to retransmit the data. Particularly when the output level of the network apparatus is set to be "low", the network apparatus must retransmit the data many times as long as the radio condition is not improved. In the seventh embodiment, therefore, the output level of a network apparatus retransmitting data is changed over from "low" to "high". As a result, the network apparatus can keep the retransmission of the data to a minimum.

When the aforementioned change of the output level due to data retransmission has to be performed with high frequency (for example, at a ratio of 30% or higher with respect to all communications), all the communications of the retransmitted data to the destination may be performed on a high output level. As a result, the frequency with which the data is retransmitted is reduced so that the communication efficiency can be increased.

Eighth Embodiment

Examples of typical wireless LAN standards include IEEE 802.11a, 11b and 11g. IEEE 802.11a uses radio waves whose frequency is in a 5 GHz band, while IEEE 802.11b and 11g use radio waves whose frequency is in a 2.4 GHz band. Communication using IEEE 802.11a and communication using IEEE 802.11b or 11g can be performed simultaneously. At that time, IEEE 802.11a has no radio interference with the other standards because the frequency used by the former is different from that by the latter. However, IEEE 802.11b and 11g use the same frequency band so that they can interfere with each other. Accordingly, in the eighth embodiment, the output level is set to be "high" for communication using one of IEEE 802.11b and 11g, while the output level is set to be "low" for communication using the other. As a result, the interference between IEEE 802.11b and 11g can be prevented.

Other Embodiments

Although the embodiments of the invention have been described above, the invention is not limited to the aforementioned specific embodiments. The invention can be carried out in various other modes.

For example, the aforementioned embodiments have shown examples in which the transmitting output level is changed over to either "high" or "low". However, the transmitting output level may be changed over in more stages. In this case, transmitting output levels can be associated more finely with a larger number of protocols. For example, when the transmitter 52 can change over the transmitting output level in 10 stages, the output level flag is made a flag which can take numerical values ranging from 1 to 10, and the numerical values are associated with various protocols and stored in an output level table so as to be used for controlling the transmitter 52.

Although the memory of the PC 2 stores the output level table in the aforementioned embodiments, the memory may store a program having a function similar to the output level table. For example, the program is described out of IF statements. When the program is executed with a port number inputted as a parameter, the program outputs a transmitting output level corresponding to the port number.

Based on some protocols, data (packets) will be transmitted to a specific port number. The destination port will serve as a source of a reply from the destination. Thus, the data (packets) will be transmitted from a specific source port number. In the storage unit, specific port number is assigned to each of the plurality of protocols, and a predetermined output level is associated with the specific port number.

In this case, the data processing unit may attach a port number corresponding to the predetermined protocol to the processed data with reference to the storage unit. The transmission control unit may assign an output level corresponding to the port number attached to the processed data with reference to the storage unit, and may control the data transmitting unit to transmit the processed data at the assigned output level.

In some cases the port number corresponding to the specific protocol is fixed, but in some cases the destination port number corresponding to the specific protocol is notified beforehand from a node serving as a destination through data communication between nodes. In the latter cases, a port number to be used in the predetermined protocol may be received from a terminal as a destination of data as a result of a port number acquisition request to the terminal, and the received port number and the predetermined protocol may be stored in the storage unit in correspondence with each other.

Various protocols can be imagined as protocols for which the transmitting output level should be changed. For specific example, the transmission control unit may control the data transmitting unit to transmit the data to be transmitted at output levels associated with TCP and UDP respectively.

Description will be made in more detail. In TCP (Transmission Control Protocol), the existence of an error during data transmission is checked, and a measure such as retransmission is taken when an error is detected. Thus, TCP is often used for transmitting data having a comparatively high degree of importance. On the other hand, in UDP (User Datagram Protocol), the existence of an error during data transmission is not checked. Thus, UDP is often used for transmitting data having a comparatively low degree of importance, where some error is allowed. Accordingly, in this case, for example, an output level "high" is set for TCP and an output level "low" is set for UDP. The transmission control unit controls the data transmitting unit to transmit the data to be transmitted at output levels associated with TCP and UDP respectively.

In such a manner, when it is intended to perform data transmission using TCP between nodes, the probability that data transmission using UDP and performed by a neighbor node interferes with the data transmission using TCP becomes lower. Thus, retransmission or the like hardly occurs on the TCP side so that the throughput in the data transmission on the TCP side is improved. Not to say, the probability that communication is interfered with on the UDP side becomes higher correspondingly. From the beginning, however, a data error is allowed on the UDP side to some extent. Thus, the data error often presents no severe problem. Accordingly, the throughput is improved in view of the whole system those nodes take part in.

In the aforementioned example, it is assumed that the throughput on the TCP side is intended to be enhanced and occurrence of some slight data error provides no problem on the UDP side. In a system where reliability on the UDP side is intended to be enhanced and the reduction in throughput on the TCP side is allowed, the setting of the output level may be reversed so that the output level "low" is set for TCP and the output level "high" is set for UDP. That is, a protocol to give more importance to can differ from one individual wireless network system to another. Thus, which protocol to associate a high transmitting output level with may be determined for each individual wireless network system in consideration of a protocol to give importance to.

There is another case other than the aforementioned case of TCP and UDP. For example, in a network where network apparatuses supporting UPnP (trademark) are nodes, network apparatuses having various functions perform connection/disconnection with the network on demand. To this end, a network apparatus as a destination is discovered using a protocol called SSDP (Simple Service Discover Protocol), and a service/device descriptor in which information of service provided by the network apparatus, performance information, etc. are described in XML (Extensible Markup Language) may be acquired by HTTP (HyperText Transfer Protocol) so as to query information. After that, data transmission to the discovered network apparatus is performed. In this case, first data for discovering the destination and querying information are transmitted repeatedly periodically to some extent in order to grasp nodes taking part in the network.

Therefore, even when a data error happens to occur, it will be often sufficient if the data are transmitted the next time. On the other hand, second data to be transmitted to a destination after the destination is discovered are typically not transmitted repeatedly periodically. Accordingly, in this case, the processed data includes first data to be transmitted in a preliminary phase before using functions belonging to a terminal as a destination of the data, and second data to be transmitted to the terminal in a phase after the preliminary phase, and the transmission control unit may control the data transmitting unit to transmit the first data and the second data at output levels associated therewith respectively. More specifically, for example, in the preliminary phase, the first data are transmitted for searching the terminal and inquiring for information about the terminal.

Further, when a plurality of data to be transmitted are transmitted continuously, output levels associated with the data to be transmitted are not always identical. In this case, when the transmission control unit controls the data transmitting unit to change over the output level for each data to be transmitted, the interval with which the plurality of data to be transmitted are transmitted is prolonged in a device in which a certain measure of time is required for changing over the transmitting output level. Thus, there occurs a problem that the time taken since the start of transmission and till the completion of the transmission is increased. In this case, therefore, the data transmitting unit intermittently transmits data to be processed based on different protocols respectively, while the transmission control unit controls the data transmitting unit to transmit data processed by the data processing unit on a largest one out of different output levels associated with the different protocols respectively.

With such a configuration, when a plurality of data to be transmitted are transmitted continuously, output levels associated with the data to be transmitted do not have to be identical. That is, all the plurality of data to be transmitted are transmitted on the highest one of the different output levels. Accordingly, it does not take much time to change over the output level, so that the time taken since the start of transmission and till the completion of the transmission can be shortened.

Further, it is desired that as a unit for making the data processing unit and the transmission control unit interlock with each other, the data processing unit includes an output level notification unit that notifies the transmission control unit of an output level associated with the predetermined protocol, and the transmission control unit controls the data transmitting unit to transmit data processed by the data processing unit at the output level notified by the output level notification unit.

A desired method may be used as a specific method for notifying the transmission control unit of the notification from the output level notification unit. For example, the output level notification unit attaches output level information indicating an output level to the processed data. Thus, the transmission control unit is notified of the notification from the output level notification unit through the output level information attached to the data to be transmitted.

The data processing unit is comprised of software groups forming an application layer, a socket interface layer and a protocol stack layer respectively, and designed so that a driver serving as the transmission control unit to which data is transmitted from the application layer through the socket interface layer and the protocol stack layer controls the data transmitting unit to transmit the processed data, while the output level information is prepared in the socket interface layer, and the output level information is attached to the processed data in the protocol stack layer.

With such a configuration, an existing software group used in such a kind of wireless network apparatus can be used as it is as the software group forming the application layer. As for the software group forming the protocol stack layer, an existing software group used in such a kind of wireless network apparatus can be used as it is without arranging a major complicated part of the software group only when a function of attaching the output level information to data to be transmitted is added to a socket interface part thereof. Then, the characteristic configuration of the invention can be achieved only by adding functions to the socket interface and the driver.

Further, a desired method may be used as the method for acquiring the output level associated with the protocol corresponding to the port number. For example, the output level notification unit specifies an output level based on a port number associated with the predetermined protocol with reference to the storage unit, and notifies the transmission control unit of the specified output level.

When such an output level table is used and if a port number corresponding to a specific protocol is fixed, a specific level may be stored beforehand as the output level associated with the port number. A port number corresponding to a specific protocol may be reported from a node as a destination through data communication held between nodes in advance. In this case, the port number may be acquired from the destination dynamically. Then, a output level associated with the protocol using the port number may be written into the output level table.

In addition, a program for use in a network apparatus including a data transmitting unit that transmits data by wireless at a predetermined output level out of a plurality of output levels, and a storage unit that stores the output levels of the data transmitting unit associated with a plurality of protocols respectively, the program making a computer in the network apparatus execute: a data processing procedure that processes data to be transmitted based on a predetermined protocol selected from the plurality of protocols; and a transmission control procedure that controls the data transmitting unit so as to transmit data processed in the data processing procedure at an output level associated with the predetermined protocol. When the program is introduced into the network apparatus, the network apparatus can be configured as described previously, thereby exerting the operation and effect as described previously.

Furthermore, in the network apparatus, the storage unit stores output levels of the data transmitting unit respectively associated with phases passing through until the establishment of connection with another network apparatus, and the transmission control unit controls the data transmitting unit so as to transmit data at an output level associated with each phase passing through until the establishment of connection with another network apparatus.

Furthermore, the network apparatus may be an access point.

Furthermore, in the network apparatus, when data transmitted from the data transmitting unit has to be retransmitted, the data transmission control unit controls the data transmitting unit so as to retransmit the data at a higher output level than an output level set before retransmission.

What is claimed is:

1. A network apparatus comprising:
   a data transmitting unit that wirelessly transmits data at a predetermined output level out of a plurality of output levels;
   a data processing unit that processes data to be transmitted based on a predetermined protocol selected from a plurality of protocols;
   a storage unit that stores the output levels of the data transmitting unit associated with the plurality of protocols respectively; and
   a transmission control unit that controls the data transmitting unit so as to transmit data processed by the data processing unit at an output level associated with the predetermined protocol;
   the data processing unit including an output level notification unit that notifies the transmission control unit of an output level associated with the predetermined protocol; and
   the transmission control unit controlling the data transmitting unit to transmit data processed by the data processing unit at the output level notified by the output level notification unit.

2. The network apparatus according to claim 1, wherein, in the storage unit, specific port number is assigned to each of the plurality of protocols, and a predetermined output level is associated with the specific port number.

3. The network apparatus according to claim 2, wherein the data processing unit attaches a port number corresponding to the predetermined protocol to the processed data with reference to the storage unit.

4. The network apparatus according to claim 3, wherein the transmission control unit assigns an output level corresponding to the port number attached to the processed data with reference to the storage unit, and controls the data transmitting unit to transmit the processed data at the assigned output level.

5. The network apparatus according to claim 2, wherein a port number to be used in the predetermined protocol is received from a terminal as a destination of data as a result of a port number acquisition request to the terminal, and the received port number and the predetermined protocol are stored in the storage unit in correspondence with each other.

6. The network apparatus according to claim 2, wherein the data transmitting unit intermittently transmits data to be processed based on different protocols respectively, while the transmission control unit controls the data transmitting unit to transmit data processed by the data processing unit on a largest one out of different output levels associated with the different protocols respectively.

7. The network apparatus according to claim 1, wherein the transmission control unit controls the data transmitting unit to transmit the data to be transmitted at output levels associated with TCP and UDP respectively.

8. The network apparatus according to claim 1, wherein the processed data includes first data to be transmitted in a preliminary phase before using functions belonging to a terminal as a destination of the data, and second data to be transmitted to the terminal in a phase after the preliminary phase, and
the transmission control unit controls the data transmitting unit to transmit the first data and the second data at output levels associated therewith respectively.

9. The network apparatus according to claim 8, wherein, in the preliminary phase, the first data are transmitted for searching the terminal and inquiring for information about the terminal.

10. The network apparatus according to claim 1,
wherein the output level notification unit attaches output level information indicating an output level to the processed data.

11. The network apparatus according to claim 10,
wherein the data processing unit is comprised of software groups forming an application layer, a socket interface layer and a protocol stack layer respectively, and designed so that a driver serving as the transmission control unit to which data is transmitted from the application layer through the socket interface layer and the protocol stack layer controls the data transmitting unit to transmit the processed data, while the output level information is prepared in the socket interface layer, and the output level information is attached to the processed data in the protocol stack layer.

12. The network apparatus according to claim 1,
wherein the output level notification unit specifies an output level based on a port number associated with the predetermined protocol with reference to the storage unit, and notifies the transmission control unit of the specified output level.

13. The network apparatus according to claim 1,
wherein when data transmitted from the data transmitting unit has to be retransmitted, the data transmission control unit controls the data transmitting unit so as to retransmit the data at a higher output level than an output level set before retransmission.

14. A computer-readable medium storing a computer-executable program for use with a network apparatus, the network apparatus including a data transmitting unit that wirelessly transmits data at a predetermined output level out of a plurality of output levels, and a storage unit that stores the output levels of the data transmitting unit associated with a plurality of protocols respectively, the program causing the computer to execute:
- a data processing procedure that processes data to be transmitted based on a predetermined protocol selected from the plurality of protocols; and
- a transmission control procedure that controls the data transmitting unit so as to transmit data processed in the data processing procedure at an output level associated with the predetermined protocol;
- the data processing unit including an output level notification unit that notifies the transmission control unit of an output level associated with the predetermined protocol; and
- the transmission control unit controlling the data transmitting unit to transmit data processed by the data processing unit at the output level notified by the output level notification unit.

15. A network apparatus comprising:
- a data transmitting unit that wirelessly transmits data at a predetermined output level out of a plurality of output levels;
- a storage unit that stores each output level of the data transmitting unit associated with each phase before and after establishment of connection with another network apparatus; and
- a transmission control unit that controls the data transmitting unit so as to transmit data at an output level associated with each phase of connection with another network apparatus;
- the storage unit storing output levels of the data transmitting unit respectively associated with phases passing through until the establishment of connection with another network apparatus; and
- the transmission control unit controlling the data transmitting unit so as to transmit data at an output level associated with each phase passing through until the establishment of connection with another network apparatus.

16. The network apparatus according to claim 15,
wherein the network apparatus is an access point.

17. A network apparatus comprising:
- a storage unit that stores output levels of the data transmitting unit respectively associated with a plurality of wireless communication systems that enables to be used by the data transmitting unit; and
- a transmission control unit that controls the data transmitting unit so as to transmit data at an output level associated with a wireless communication system used by the data transmitting unit;
- the data processing unit including an output level notification unit that notifies the transmission control unit of an output level associated with the predetermined protocol; and
- the transmission control unit controlling the data transmitting unit to transmit data processed by the data processing unit at the output level notified by the output level notification unit.

* * * * *